US008547073B2

(12) United States Patent
Fujii

(10) Patent No.: US 8,547,073 B2
(45) Date of Patent: Oct. 1, 2013

(54) OUTPUT SIDE CAPACITOR VOLTAGE BALANCING DC POWER SUPPLY SYSTEM

(75) Inventor: Kansuke Fujii, Machida (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 0 days.

(21) Appl. No.: 13/525,264

(22) Filed: Jun. 15, 2012

(65) Prior Publication Data

US 2012/0319664 A1    Dec. 20, 2012

(30) Foreign Application Priority Data

Jun. 20, 2011  (JP) ................................. 2011-136324

(51) Int. Cl.
 *G05F 1/613* (2006.01)
 *G05F 1/00* (2006.01)
 *G05F 3/16* (2006.01)

(52) U.S. Cl.
 USPC ........... 323/224; 323/222; 323/223; 323/266; 323/282

(58) Field of Classification Search
 USPC ........................... 323/222–224, 266, 282–285
 See application file for complete search history.

(56) References Cited

U.S. PATENT DOCUMENTS 5,942,884 A * 8/1999 Soar et al. ...................... 323/282
6,016,258 A * 1/2000 Jain et al. ......................... 363/17
6,353,547 B1 * 3/2002 Jang et al. ..................... 363/132
7,050,311 B2 * 5/2006 Lai et al. .......................... 363/37
7,061,777 B2 * 6/2006 Zeng et al. ...................... 363/17
7,995,362 B2 * 8/2011 Paull et al. .................. 363/56.01
8,144,490 B2 * 3/2012 El-Barbari et al. ............. 363/43
8,269,141 B2 * 9/2012 Daniel et al. ............... 219/130.1
8,427,010 B2 * 4/2013 Bose et al. ...................... 307/82
8,432,710 B2 * 4/2013 Yamada .......................... 363/44
2006/0062034 A1 * 3/2006 Mazumder et al. ........... 363/131
2009/0085537 A1   4/2009 Nakabayashi et al.
2010/0039080 A1   2/2010 Schoenbauer et al.
2011/0122667 A1 * 5/2011 Mino et al. ..................... 363/125
2012/0126764 A1 * 5/2012 Urakabe et al. ............... 323/282

FOREIGN PATENT DOCUMENTS

JP    2008-295228 A    12/2008
JP    2010-045966 A     2/2010
WO   WO-2007-110954 A1  10/2007

* cited by examiner

*Primary Examiner* — Bao Q Vu
*Assistant Examiner* — Yusef Ahmed
(74) *Attorney, Agent, or Firm* — Rabin & Berdo, P.C.

(57) ABSTRACT

A DC power supply system delivers a DC output that has a neutral point and is higher than the input voltage of a single DC power supply, by a circuit with series-connected switching elements. The DC power supply system addresses the problem of imbalance between the voltage between a positive terminal and the neutral point and the voltage between a negative terminal and the neutral point. In operational control of the DC power supply system, a capacitor voltage between the neutral point and the positive terminal and a capacitor voltage between the neutral point and the negative terminal are compared, and four switching elements are operated to equalize the two capacitor voltages.

7 Claims, 8 Drawing Sheets

OUTPUT SIDE CAPACITOR VOLTAGE BALANCING DC POWER SUPPLY SYSTEM

CROSS-REFERENCE TO RELATED APPLICATION

This application is based on, and claims priority to, Japanese Patent Application No. 2011-136324, filed on Jun. 20, 2011, contents of which are incorporated herein by reference.

BACKGROUND OF THE INVENTION

1. Field of the Invention

The present invention relates to DC power supply systems that step-up DC voltage of a DC power supply such as a battery to DC voltage having a neutral point, the DC power supply systems including uninterruptible power systems (UPSs), solar power generation systems, and fuel cells, for example. The invention relates in particular to a control system to keep balance between the voltages across a capacitor and across another in a series-connected capacitor circuit provided in the DC output side of the DC power supply system.

2. Description of the Related Art

FIG. 8 is a circuit diagram of the DC power supply system employing conventional technology disclosed in Japanese Unexamined Patent Application Publication No. 2008-295228. The main circuit comprises a DC power supply 8 for supplying DC power, reactor 1, switching elements 2A and 2B, diodes 3AD and 3BD, and output capacitors 4A and 4B. The switching elements 2A and 2B perform a switching operation to obtain desired voltages across the capacitor 4A and across the capacitor 4B, supplying the load 9 with a DC output voltage higher than the voltage of the DC power supply 8. The control operation of this circuit construction is performed by ON-OFF-controlling the switching elements 2A and 2B with shifted phase angles using the reactor 1 composed of two magnetically coupled windings. This control system reduces ripples in the current through the reactor 1, forming a device in a small size and at a low cost, which is the aim of the control system. Details of the control system are described in Japanese Unexamined Patent Application Publication No. 2008-295228 and so omitted here. This circuit is a unidirectional step-up chopper circuit for supplying power from the DC power supply 8 to the load 9. The circuit, however, becomes also a bidirectional step-up chopper circuit for regenerating power from the load 9 to the DC power supply 8 by adding switching elements anti-parallel-connected to the diodes 3AD and 3BD.

Also shown in FIG. 8 are reactor nodes 1A, 1B, 1C and 1D, diodes 2AD and 2BD, and pulse width modulation circuits 16 and 19 that receive inputs from a control circuit 15. Circuit 16 includes a comparator 18 with an input carrier generator 17, and circuit 19 includes a comparator 21 with an input carrier generator 20. Also shown in FIG. 8 are voltage detection circuits 11, 13 and 14, and circuit elements 10 and 12. Voltage detection circuits 13 and 14 are connected at a node 5.

When the chopper of Japanese Unexamined Patent Application Publication No. 2008-295228 is connected to a three-level inverter such as an uninterruptible power system (UPS), the inverter, a DC to AC conversion circuit, is connected to the chopper at both ends of the capacitors 4A and 4B and the point of series connection between the two capacitors. The voltages across the capacitor 4A and the voltage across the capacitor 4B become unbalanced due to dispersion in the voltage drops of semiconductor elements, the impedances of circuit components, and gate signals, and also due to imbalance of DC power caused by the inverter as a load. This imbalance results in excessive voltage or deficient voltage that may cause interruption of operation.

SUMMARY OF THE INVENTION

It is therefore an object of the present invention to provide a DC power supply system of a bidirectional step-up type that supplies balanced voltages of series-connected DC output capacitors despite dispersion in component characteristics and operating signals, or imbalance of power at the load.

To accomplish the object stated above, the first aspect of the invention provides a DC power supply of a step-up type that comprises series-connected first, second, third and fourth switching elements each having an anti-parallel-connected diode, a first reactor with one end thereof connected to a point between the series-connected first switching element and the second switching element, a second reactor with one end thereof connected to a point between the series-connected third switching element and the fourth switching element, a DC power supply with one end thereof connected to the other end of the first reactor and with the other end thereof connected to the other end of the second reactor, a first capacitor connected in parallel to the series-connected first switching element and the second switching element, and a second capacitor connected in parallel to the series-connected third switching element and the fourth switching element.

A DC output voltage of the DC power supply system is a voltage of a series-connected circuit of the first capacitor and the second capacitor, and the DC power supply system has output terminals of a positive terminal at one end of the first capacitor, a neutral terminal at a point of series-connection of the first capacitor and the second capacitor, and a negative terminal at one end of the second capacitor.

The DC power supply system operates in a first mode and a second mode. In the first mode, the DC power supply system operates under conditions in which a voltage across the first capacitor and a voltage across the second capacitor are lower than a voltage of the DC power supply, electric current in the first and second reactors flows in a discontinuous mode, and the voltage across the first capacitor is higher than the voltage across the second capacitor. Further, in the first mode the DC power supply system operates through a procedure in which the second switching element is turned ON to make electric current flow successively through the DC power supply, the first reactor, the second switching element, the second capacitor, the diode of the fourth switching element, and the second reactor, and in which the second switching element is then turned OFF to transfer magnetic energy stored in the first and the second reactors to the first and the second capacitors to charge the capacitors.

Then, in the first mode, the first and the fourth switching elements are turned ON to discharge the first capacitor down to a voltage at a value before the second switching element is turned ON.

In the second mode, the DC power supply system operates under the same conditions as in the first mode except that the voltage across the first capacitor is lower than the voltage across the second capacitor, through the same procedure as in the first mode except that the third switching element is turned ON and OFF in place of the second switching element, and the fourth switching element is turned ON and OFF in place of the first switching element.

The second aspect of the present invention provides a DC power supply system of a step-up type that comprises series-connected first, second, third and fourth switching elements, each having an anti-parallel-connected diode, a first reactor with one end thereof connected to a point between the series-connected first switching element and the second switching element, and a second reactor with one end thereof connected to a point between the series-connected third switching element and the fourth switching element. The DC power supply system further comprises a DC power supply with one end thereof connected to the other end of the first reactor and with the other end thereof connected to the other end of the second reactor, a first capacitor connected in parallel to the series-connected first switching element and the second switching element, and a second capacitor connected in parallel to the series-connected third switching element and the fourth switching element. The DC power supply system further comprises a series-connected fifth switching element and sixth switching element each having an antiparallel-connected diode connected in parallel to the series-connected first and the second capacitors, and a third reactor connected between a point of series-connection of the first and the second capacitors and a point of series-connection of the fifth and sixth switching elements.

A DC output voltage of the DC power supply system is a voltage of a series-connected circuit of the first capacitor and the second capacitor, and the DC power supply system has output terminals of a positive terminal at one end of the first capacitor, a neutral terminal at a point of series-connection of the first capacitor and the second capacitor, and a negative terminal at one end of the second capacitor. The DC power supply system operates in a third mode, fifth mode, fourth mode, and sixth mode.

In the third mode, the DC power supply system operates under conditions in which a voltage across the first capacitor and a voltage across the second capacitor are lower than a voltage of the DC power supply, electric current in the first and second reactors flows in a continuous mode, and the voltage across the first capacitor is higher than the voltage across the second capacitor. Further, in the third mode the DC power supply system operates through a process in which the first switching element and the second switching element are alternately turned ON and OFF with an ON time of the second switching element being longer than an ON time of the first switching element, and in which the third switching element and the fourth switching element are alternately turned ON and OFF with an ON time of the fourth switching element being longer than an ON time of the third switching element.

In the fifth mode, the DC power supply system operates under the same conditions and through the same process as in the third mode except that when the ON time of the first switching element or the ON time of the third switching element is not present and the voltage across the first capacitor and the voltage across the second capacitor are different from each other, an ON time of the fifth switching element is made longer than an ON time of the sixth switching element. At this time, the ON time of the first switching element and the fourth switching element is made equal to the ON time of the second switching element and the third switching element.

In the fourth mode, the DC power supply system operates under the same conditions as in the third mode except that the voltage across the first capacitor is lower than the voltage across the second capacitor, and through a process in which the first switching element and the second switching element are alternately turned ON and OFF with the ON time of the first switching element being longer than the ON time of the second switching element, and the third switching element and the fourth switching element are alternately turned ON and OFF with an ON time of the third switching element being longer than the ON time of the fourth switching element.

In the sixth mode, the DC power supply system operates under the same conditions and through the same process as in the fourth mode except that when the voltage across the first capacitor and the voltage across the second capacitor are different from each other even with the maximum ON time of the first switching element or the third switching element, the ON time of the sixth switching element is made longer than the ON time of the fifth switching element.

The DC power supply system of the invention is controlled by changing operation of the switching elements corresponding to whether the reactor current is discontinuous or continuous to achieve balance between the voltages of series-connected capacitors. In the case that operation of only the switching elements does not provide control, an additionally provided balancer circuit performs control. As a result, balance between the voltages of the capacitors is established, even in the case of imbalance between discharging power to the load from the first capacitor and discharging power from the second capacitor, or imbalance between charging power from the load to the first capacitor and discharging power from the load to the second capacitor.

DETAILED DESCRIPTION OF THE INVENTION

The main point of the present invention is that the switching elements are controlled to make the voltages of series-connected capacitors balanced in the case of discontinuous reactor current, and the additionally provided balancer circuit performs the balance of the capacitor voltages in the case of continuous reactor current in which control is impossible by operation of the switching elements only.

[First Embodiment]

Figure 1:
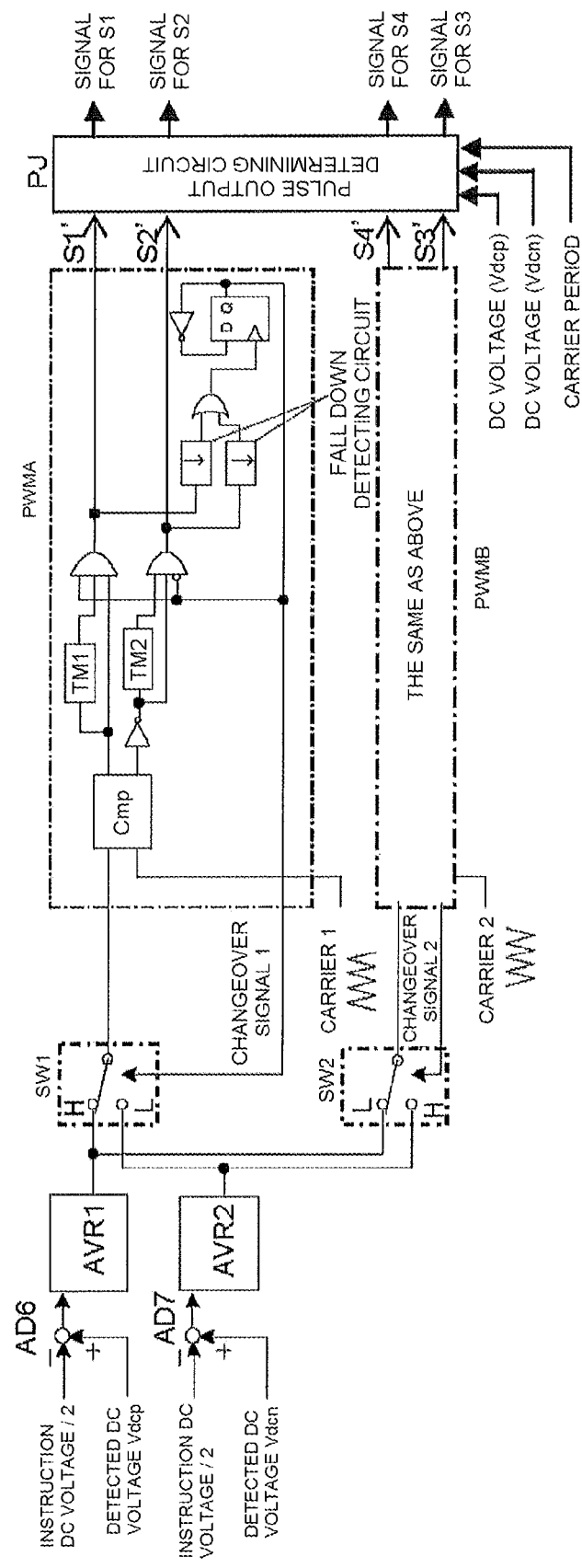
FIG. 1 is a block diagram of a control circuit in the first embodiment according to the present invention.
Figure 3:
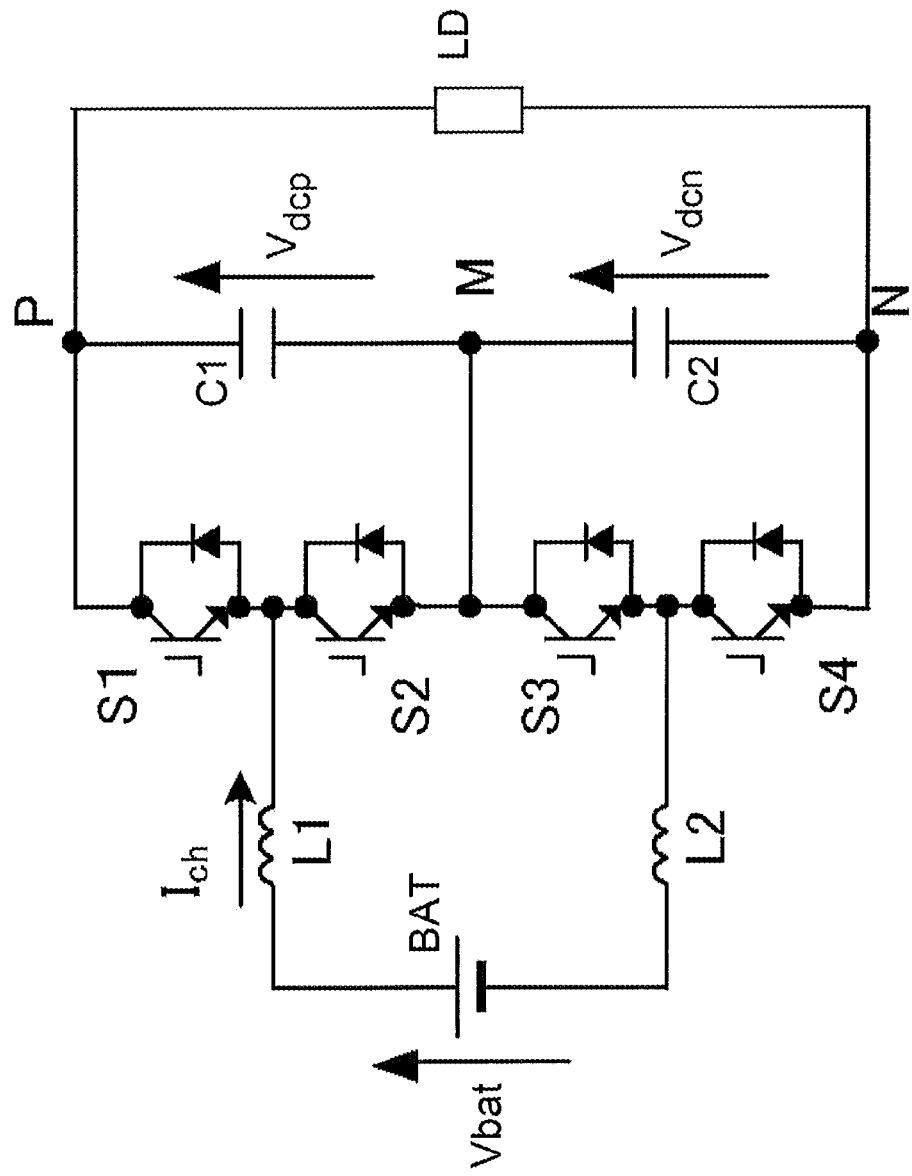
FIG. 3 is a circuit diagram of a main circuit of the first embodiment according to the present invention.

FIG. 1 shows a control circuit in the first embodiment according to the present invention, and FIG. 3 shows a main circuit in the first embodiment according to the present invention. The main circuit structure of FIG. 3 is used in a discontinuous mode of the current through reactors L1 and L2 in this embodiment. The main circuit comprises: series-connected switching elements S1 through S4 each having an antiparallel-connected diode, a first reactor L1 with an end thereof connected to the point of series connection of the switching elements S1 and S2, a second reactor L2 with an end thereof connected to the point of series connection of the switching elements S3 and S4, a battery BAT as a DC power supply connected between the other end of the first reactor L1 and the other end of the second reactor L2, a first capacitor C1 parallel-connected to the series-connected switching elements S1 and S2, and a second capacitor C2 parallel-connected to the series-connected switching elements S3 and S4. A load LD is connected in parallel to the series-connected circuit of the capacitors C1 and C2.

Figure 4:
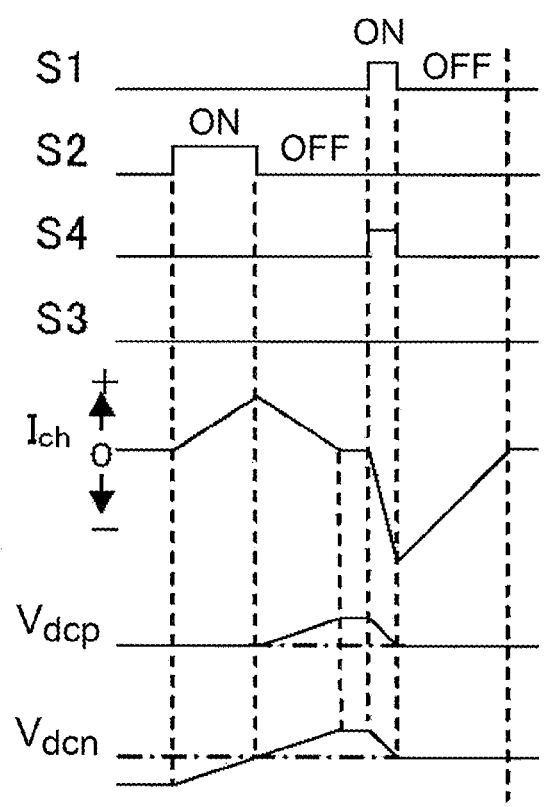
FIG. 4 shows waveforms in operation of the first embodiment according to the present invention.
Figure 5:
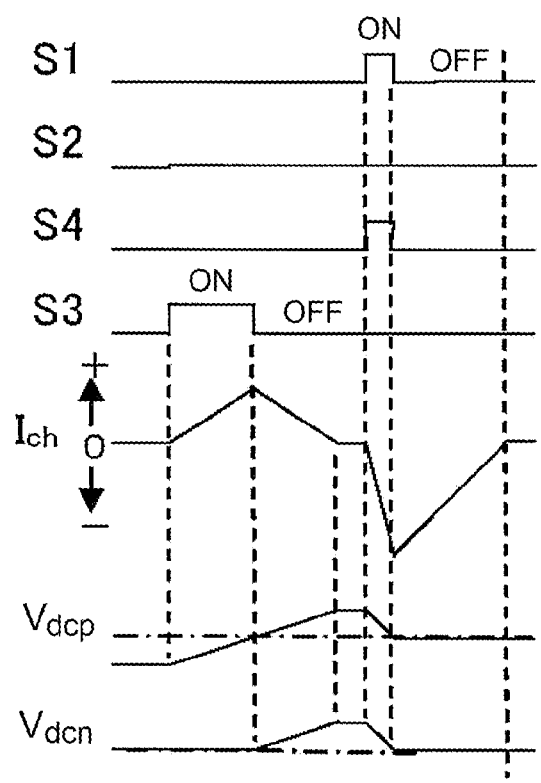
FIG. 5 shows waveforms in operation of the first embodiment according to the present invention.

FIG. 1 shows a control circuit for ON-OFF-controlling the switching elements S1 through S4 in the circuit of FIG. 3. FIGS. 4 and 5 show waveforms in the ON-OFF operation of the switching elements. Referring to FIG. 1 first, an amount of deviation of a detected DC voltage Vdcp from a DC voltage instruction value that is half the DC output voltage is obtained in an adder AD6 and given to a voltage regulator AVR1. Likewise, an amount of deviation of a detected DC voltage Vdcn from a DC voltage instruction value that is half the DC output voltage is obtained in an adder AD7 and given to a voltage regulator AVR2. A changeover switch SW1 performs changeover between the output of the voltage regulator AVR1 and the output of the voltage regulator AVR2. The output of the switch SW1 is given to a comparator Cmp and compared there with a carrier1. A logical product of three signals—the comparison result with the carrier1 given by the comparator Cmp, the output of the Cmp after being delayed for a dead time by a delay circuit TM1, and a switching signal1 for the changeover switch SW1—is created. The logical product is referred to as S1'.

Another logical product S2' is created from three signals—an inversion of the comparison result with the carrier1 given by the comparator Cmp, the inversion of the Cmp after delay for a dead time by a delay circuit TM2, and an inversion of the switching signal1 for the changeover switch SW1. The signals S1' and S2' are given to two fall-down detection circuits that generate a pulse signal with a pulse width less than the dead time at the timing of fall-down (a timing of turning-off) of the signals S1' and S2'. The switching signal1 is a Q output signal of a DQ flip-flop that receives, at a D input terminal thereof, an inverted signal of the Q output and, at a clock terminal thereof, a logical sum of output signals from the two fall-down detection circuits.

Figure 6:
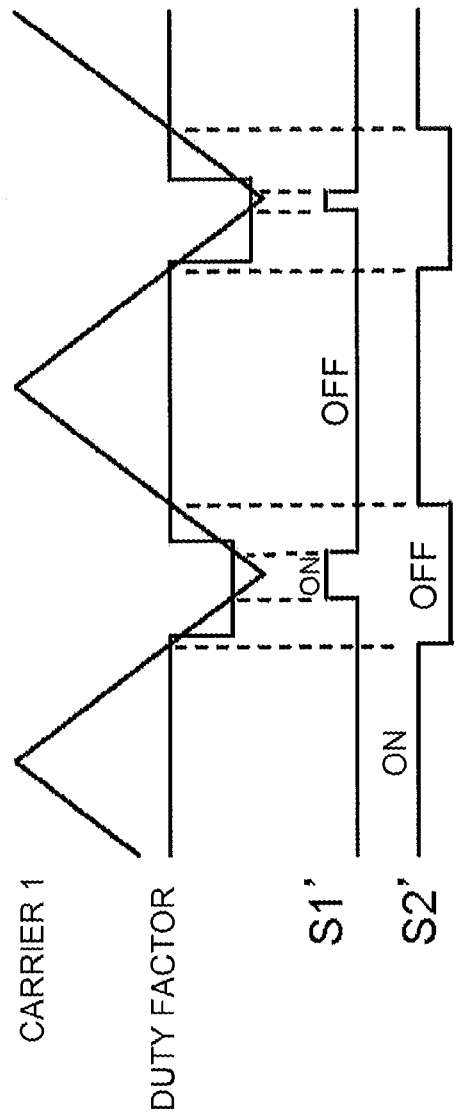
FIG. 6 shows waveforms illustrating operation of the control circuit of FIG. 1.

FIG. 6 shows relationships, in operation of the above-described circuit, among the S1' signal, the S2' signal, a voltage to determine a duty factor, and a voltage of the carrier1. The S2' signal is in an ON state when the voltage to determine a duty factor is smaller than the voltage of the carrier1 and turns OFF when the voltage to determine a duty factor is equal to the voltage of the carrier1. At this time, the voltage to determine a duty factor is changed for the signal S1'. An inverted signal of the switching signal1 is used as one of the conditions of outputting the signal S2' so that a minute abnormal signal is not delivered for the S2' signal.

The S1' signal turns ON after the dead time has passed from the time the voltage to determine a duty factor, the voltage having been changed for the S1' signal, has become smaller than the voltage of carrier1. The signal S1' turns OFF when the voltage to determine a duty factor equals the voltage of the carrier1. At this time, the voltage to determine a duty factor is changed for the signal S2'. As in the case of the S2' signal, the switching signal1 is used as one of the conditions of outputting the signal S1' so that a minute abnormal signal does not enter the S1' signal.

Similarly to the operation described above, an S3' signal and an S4' signal are generated using carrier2.

Then, the signals S1' through S4', the DC voltages Vdcp and Vdcn, and a logical sum of the switching signal1 and the switching signal2 are given to a pulse output determining circuit PJ, which delivers pulsed signals as described in the following.

(i) In the case Vdcp≥Vdcn, the signal for S1 is S1', the signal for S2 is S2', the signal for S3 is OFF, and the signal for S4 is S1'.

(ii) In the case Vdcp<Vdcn, the signal for S1 is S4', the signal for S2 is OFF, the signal for S3 is S3', and the signal for S4 is S4'.

Switching of these modes of (i) and (ii) is determined with the time of N-times the carrier period (N is usually one).

Thus, the signals for S1 through S4 are delivered. In operation of the DC power supply system of the first embodiment, in the case Vdcp≥Vdcn, as shown in FIG. 4, the S2 signal first turns ON to charge the capacitor C2 (in which the voltage is Vdcn). Then the S2 signal turns OFF to charge the capacitor C1 (in which the voltage is Vdcp) and the capacitor C2 (in which the voltage is Vdcn). After that, the S1 signal and the S4 signal turn ON to discharge the capacitor C1 (Vdcp) and the capacitor C2 (Vdcn) simultaneously. This is a first mode. By turning OFF the S1 and the S4 signals simultaneously, magnetic energy stored in the windings L1 and L2 is regenerated to the battery BAT.

In the case Vdcp<Vdcn, as shown in FIG. 5, the S3 signal first turns ON to charge the capacitor C1 (Vdcp), and then the S3 signal turns OFF to charge the capacitor C1 (Vdcp) and the capacitor C2 (Vdcn). After that, the S1 and the S4 signals turn ON to discharge the capacitor C1 (Vdcp) and the capacitor C2 (Vdcn) simultaneously. This is a second mode. By turning OFF the S1 and the S4 signals simultaneously, magnetic energy stored in the windings L1 and L2 is regenerated to the battery BAT.

[Second Embodiment]

Figure 2:
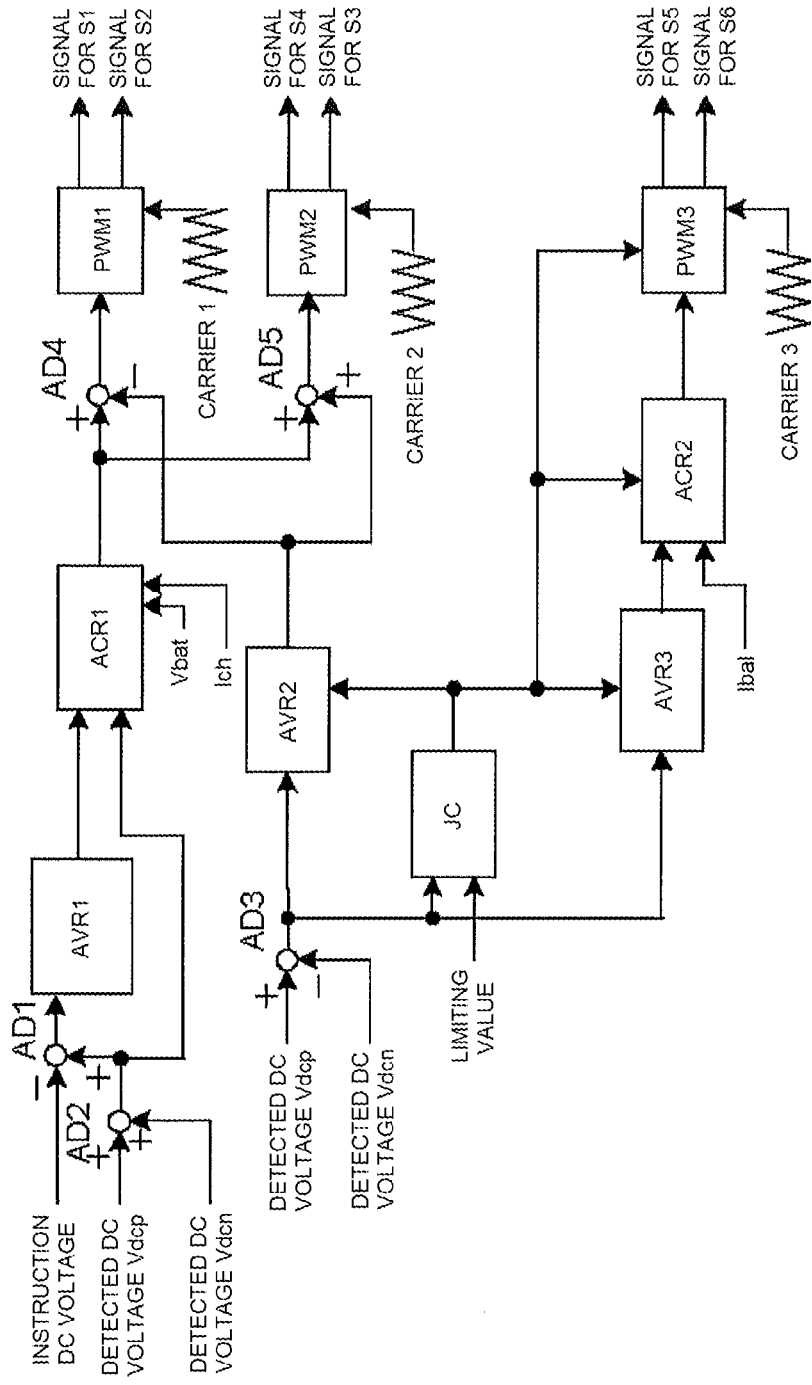
FIG. 2 is a block diagram of a control circuit in the second embodiment according to the present invention.

FIG. 2 shows a control circuit in a second embodiment according to the present invention. A voltage regulator AVR1 receives a signal from an adder AD1. The signal from adder AD1 corresponds to a magnitude of the sum of a detected DC voltage Vdcp and a detected DC voltage Vdcn, output from an adder AD2, subtracted by a DC voltage instruction value. The output from the voltage regulator AVR1 is used for a chopper current instruction signal and given to a current regulator ACR1 together with the sum of the DC voltages and a battery voltage Vbat to equalize a chopper current Ich to the chopper current instruction signal. A voltage regulator AVR2 that receives the difference between the DC voltage Vdcp and the DC voltage Vdcn, output from an adder AD3, is provided to keep DC voltage balance. An adder AD4 performs subtraction of the output signal of the voltage regulator AVR2 from the output signal of the ACR1 to obtain duty factor signals for the S1 and the S2 signals. An adder AD5 performs addition of the output signal of the voltage regulator AVR2 and the output signal of the ACR1 to obtain duty factor signals for the S3 and the S4 signals.

The S1 signal is in an ON state when the voltage of the carrier1 is higher than the voltage to determine the duty factor, and the S2 signal is in an ON state when the voltage of the carrier1 is lower than the voltage to determine the duty factor. Dead times can be generated by the circuit similar to the one in FIG. 1. The S4 signal is in an ON state (which is relatively long in a third mode) when the voltage of the carrier2 is higher than the voltage to determine the duty factor, and the S3 signal is in an ON state (which is relatively long in a fourth mode) when the voltage of the carrier2 is lower than the voltage to determine the duty factor. Dead times can be generated by the circuit similar to the one in FIG. 1. When the carrier1 and the carrier2 are in the phase angle difference of 180 degrees, the reactor current becomes the minimum.

Figure 7:
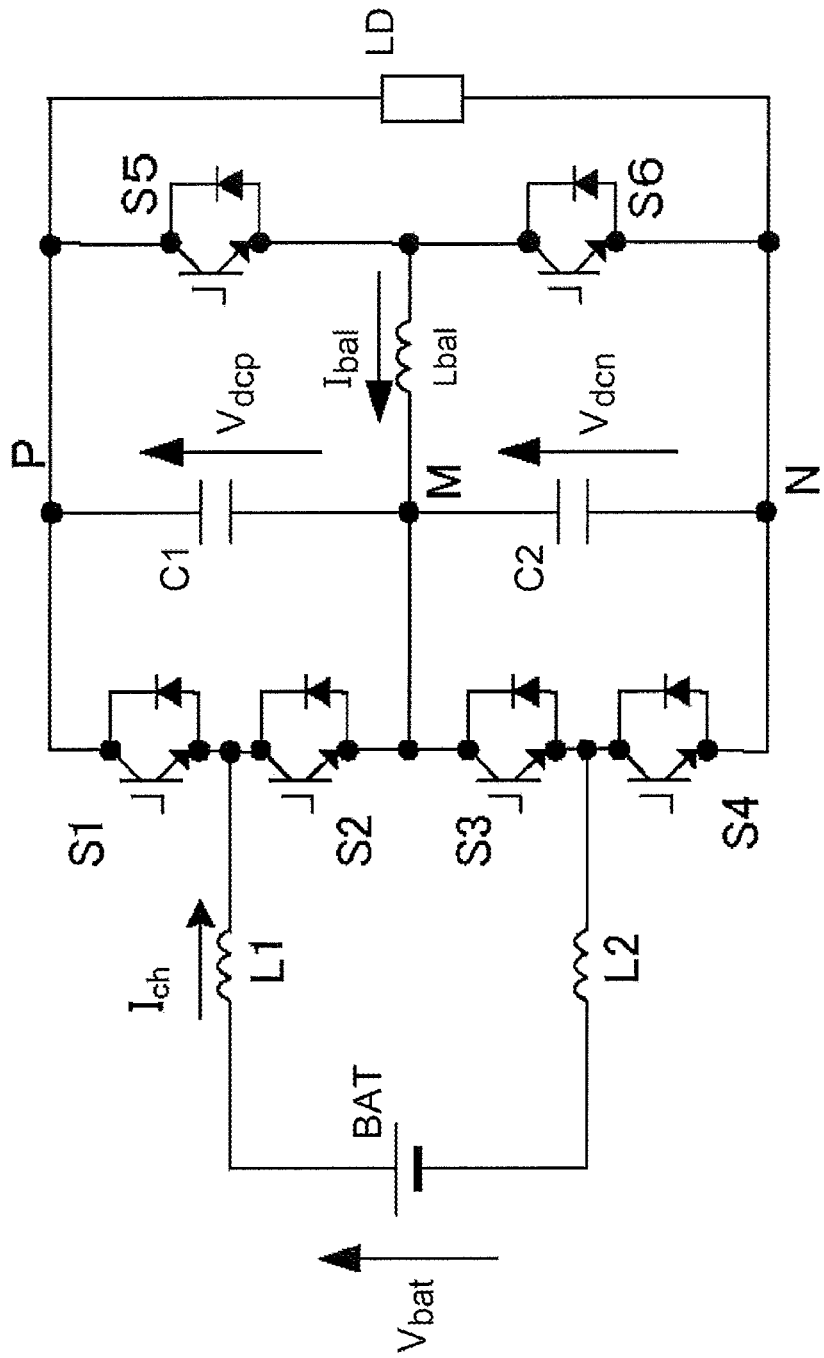
FIG. 7 is a circuit diagram of a main circuit of the second embodiment according to the present invention.
Figure 8:
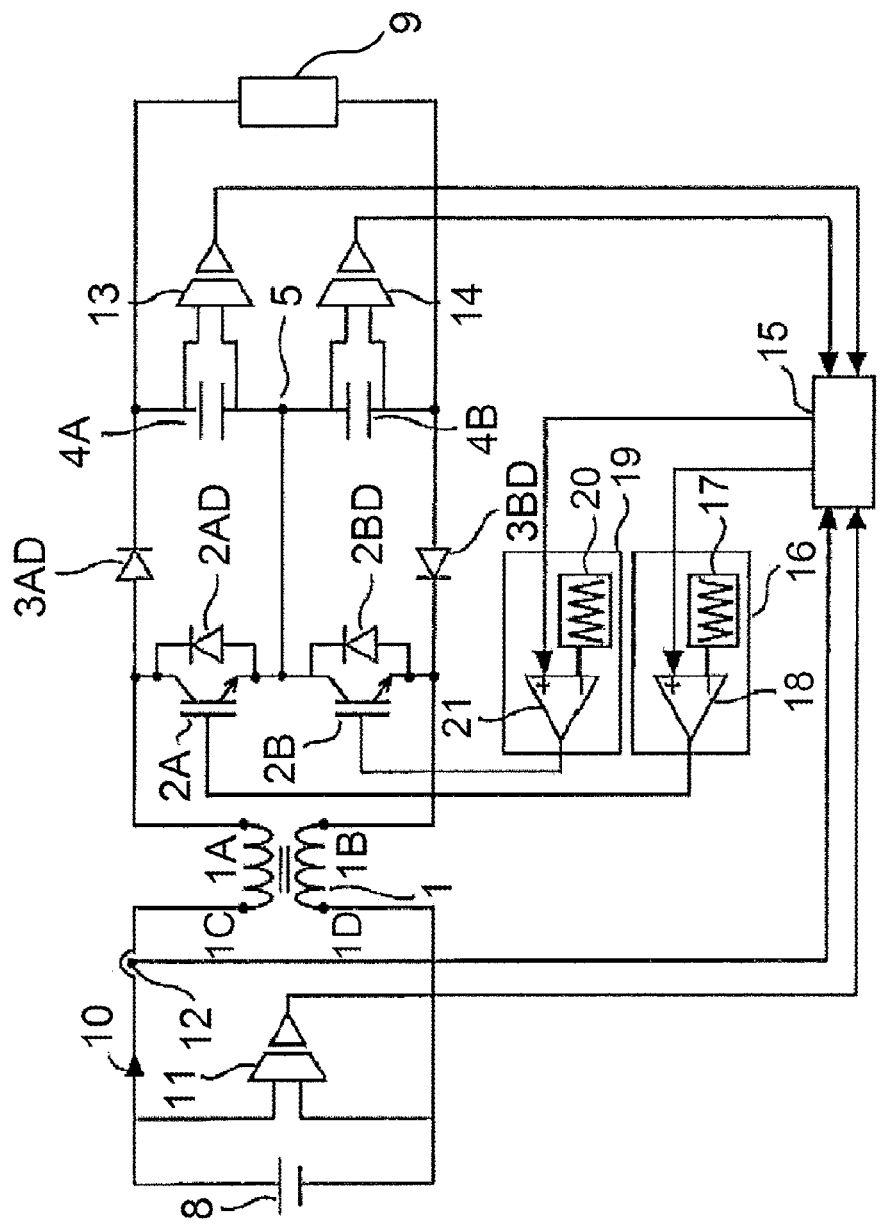
FIG. 8 is a circuit diagram of a DC power supply system according to a conventional technology.

The circuit described above can hold a balance between the DC voltage Vdcp across the capacitor C1 and the DC voltage Vdcn across the capacitor C2. If an extremely unbalanced load is connected, however, the output of the voltage regulator AVR2 for imbalance correction saturates, and the DC voltage balance is hardly maintained. To cope with such situation, a balancer circuit, as shown in FIG. 7, composed of switches S5 and S6 and a reactor Lba1 is provided. The balancer circuit is operated by the circuits provided in the control circuit of FIG. 2. When the difference between the DC voltage Vdcp and the DC voltage Vdcn exceeds a predetermined limiting value, the output of the voltage regulator AVR2 is held at zero volts, and zero-holding of the outputs of a voltage regulator AVR3, a current regulator ACR2, and a pulse width modulation circuit PWM3 for the balancer circuit is released to operate the balancer circuit. Voltage regulator AVR3 has, as inputs, an output of adder AD3 and an output of a component JC that receives a limiting value and the output of adder AD3.

The output of the voltage regulator AVR3 is used as a current instruction of balancer current Iba1 and given to the current regulator ACR2 together with the detected balancer current Iba1. The output of the current regulator ACR2 is compared with carrier3 in a PWM control circuit PWM3 and pulse width modulation is performed there. When the output voltage of the current regulator ACR2 is larger than the voltage of the carrier3, the S5 is made ON (this ON time is relatively long in fifth mode), and when the output voltage of the current regulator ACR2 is not larger than the voltage of the carrier3, the S6 signal is made ON (this ON time is relatively long in sixth mode). Dead times can be generated by the circuit similar to the one in FIG. 1. The frequency and phase angle of the carrier3 can be determined independently of those of the carrier1 and the carrier2.

As described above, the control circuit for the balancer circuit latches the output signals when the difference between the DC voltage of the capacitor C1 and the DC voltage of the capacitor C2 exceeds a predetermined limiting value, and clears the latching when the operation mode of the DC power supply system changes. In application to an uninterruptible power system (UPS) in particular, the latching is conducted during discharge of a battery, and cleared when the power supply is recovered and the operation mode is changed to charging mode of the battery.

As described thus far, the present invention provides a DC power supply system that stably supplies necessary power even in the case when an unbalanced load is connected to the power supply system.

The invention provides a DC power supply system that provides a DC output, at positive, neutral and negative terminals, higher than a voltage of a single DC power source. The DC power supply system of the invention can be applied to uninterruptible power system, inverters for solar power generation, and other similar power supply systems.

What has been described above includes examples of embodiments represented by the appended claims. It is, of course, not possible to describe every conceivable combination of components or methodologies encompassed by the claims, but it should be understood that many further combinations and permutations are possible. Accordingly, the claims are intended to embrace all such combinations, permutations, alterations, modifications and variations that fall within the spirit and scope of the claims. Moreover, the above description, and the Abstract, are not intended to be exhaustive or to limit the spirit and scope of the claims to the precise forms disclosed.

What is claimed is:

1. A DC power supply system of a step-up type comprising:
series-connected first, second, third and fourth switching elements each having an anti-parallel-connected diode, a first reactor with one end thereof connected to a point between the series-connected first switching element and the second switching element, a second reactor with one end thereof connected to a point between the series-connected third switching element and the fourth switching element, a DC power supply with one end thereof connected to another end of the first reactor and with another end thereof connected to another end of the second reactor, a first capacitor connected in parallel to the series-connected first switching element and the second switching element, and a second capacitor connected in parallel to the series-connected third switching element and the fourth switching element;

a DC output voltage of the DC power supply system being a voltage of a series-connected circuit of the first capacitor and the second capacitor, and the DC power supply system having output terminals of a positive terminal at one end of the first capacitor, a neutral terminal at a point of series-connection of the first capacitor and the second capacitor, and a negative terminal at one end of the second capacitor;

the DC power supply system being configured to operate in a first mode and a second mode, wherein in the first mode, the DC power supply system operates under conditions in which a voltage across the first capacitor and a voltage across the second capacitor are lower than a voltage of the DC power supply, electric current in the first and second reactors flows in a discontinuous mode, and the voltage across the first capacitor is higher than the voltage across the second capacitor, and through a procedure in which the second switching element is turned ON to make electric current flow successively through the DC power supply, the first reactor, the second switching element, the second capacitor, the diode of the fourth switching element, and the second reactor, then the second switching element is turned OFF to transfer magnetic energy stored in the first and the second reactors to the first and the second capacitors to charge the first and second capacitors, and then the first and the fourth switching elements are turned ON to discharge the first capacitor down to a voltage at a value before the second switching element is turned ON; and in the second mode, the DC power supply system operates under same conditions as in the first mode except that the voltage across the first capacitor is lower than the voltage across the second capacitor, and through a same procedure as in the first mode except that the third switching element is turned ON and OFF in place of the second switching element and the fourth switching element is turned ON and OFF in place of the first switching element.

2. A DC power supply system of a step-up type comprising:
series-connected first, second, third and fourth switching elements each having an anti-parallel-connected diode, a first reactor with one end thereof connected to a point between the series-connected first switching element and the second switching element, a second reactor with one end thereof connected to a point between the series-connected third switching element and the fourth switching element, a DC power supply with one end thereof connected to another end of the first reactor and with another end thereof connected to another end of the second reactor, a first capacitor connected in parallel to the series-connected first switching element and the second switching element, a second capacitor connected in parallel to the series-connected third switching element and the fourth switching element, a series-connected fifth switching element and a sixth switching element, each having an antiparallel-connected diode, connected in parallel to the series-connected first and the second capacitors, a third reactor connected between a point of series-connection of the first and the second capacitors and a point of series-connection of the fifth and sixth switching elements;

a DC output voltage of the DC power supply system being a voltage of a series-connected circuit of the first capacitor and the second capacitor, and the DC power supply system having output terminals of a positive terminal at one end of the first capacitor, a neutral terminal at a point of series-connection of the first capacitor and the second capacitor, and a negative terminal at one end of the second capacitor;

the DC power supply system being configured to operate in a third mode, a fifth mode, a fourth mode, and a sixth mode, wherein in the third mode, the DC power supply system operates
under conditions in which a voltage across the first capacitor and a voltage across the second capacitor are lower than a voltage of the DC power supply, electric current in the first and second reactors flows in a continuous mode, and the voltage across the first capacitor is higher than the voltage across the second capacitor, and
through a process in which the first switching element and the second switching element are alternately turned ON and OFF with an ON time of the second switching element being longer than an ON time of the first switching element, and the third switching element and the fourth switching element are alternately turned ON and OFF with an ON time of the fourth switching element being longer than an ON time of the third switching element;

in the fifth mode the DC power supply system operates
under same conditions and through a same process as in the third mode except that when the ON time of the first switching element or the ON time of the third switching element is not present and the voltage across the first capacitor and the voltage across the second capacitor are different from each other, an ON time of the fifth switching element is made longer than an ON time of the sixth switching element, and the ON time of the first switching element and the fourth switching element is made equal to the ON time of the second switching element and the third switching element, in the fourth mode the DC power supply system operates
under same conditions as in the third mode except that the voltage across the first capacitor is lower than the voltage across the second capacitor, and
through a process in which the first switching element and the second switching element are alternately turned ON and OFF with the ON time of the first switching element being longer than the ON time of the second switching element, and the third switching element and the fourth switching element are alternately turned ON and OFF with an ON time of the third switching element being longer than the ON time of the fourth switching element, and in the sixth mode the DC power supply operates
under same conditions and through a same procedure as in the fourth mode except that when the voltage across the first capacitor and the voltage across the second capacitor are different from each other even with a maximum ON time of the first switching element or the third switching element, the ON time of the sixth switching element is made longer than the ON time of the fifth switching element.

3. An apparatus comprising:
a first switching device connected at a first node to a second switching device;
a third switching device connected at a second node to a fourth switching device;
a first reactive device connected to a DC power supply and to the first node;
a second reactive device connected to the DC power supply and to the second node;
a first capacitive device connected in parallel to the first switching device and the second switching device;
a second capacitive device connected in parallel to the third switching device and the fourth switching device; and
first, second, third and fourth control inputs;
wherein the second switching device, the third switching device, the first capacitive device and the second capacitive device are connected to each other at a third node; and
wherein the first, second, third and fourth control inputs are configured to control, respectively, the first, second, third and fourth switching devices to balance a voltage across the first capacitive device with a voltage across the second capacitive device.

4. The apparatus of claim 3, further comprising:
a fifth switching device connected in parallel with the first capacitive device;
a sixth switching device connected in parallel with the second capacitive device;
a third reactive device; and
fifth and sixth control inputs;
wherein the fifth switching device is connected at a fourth node to the sixth switching device and the third reactive device is connected between the third node and the fourth node; and
wherein the fifth and sixth control inputs are configured to control, respectively, the fifth and sixth switching devices to balance the voltage across the first capacitive device with the voltage across the second capacitive device.

5. The apparatus of claim 4, wherein each of the first, second, third, fourth, fifth and sixth switching devices includes a switching element connected in parallel with a diode.

6. The apparatus of claim 3, wherein the first, second, third and fourth control inputs are configured to control the first, second, third and fourth switching devices at least partly in response to a condition wherein a current in the first and second reactive devices is discontinuous.

7. The apparatus of claim 4, wherein the fifth and sixth control inputs are configured to control the fifth and sixth switching devices at least in response to a condition wherein a current in the first and second reactive devices is continuous.

* * * * *